US009087278B2

(12) United States Patent
Zhang et al.

(10) Patent No.: US 9,087,278 B2
(45) Date of Patent: Jul. 21, 2015

(54) FINGERPRINT IDENTIFICATION DATA CARD AND ELECTRONIC DEVICE

(75) Inventors: Bin Zhang, Shenzhen (CN); Guangsheng Liu, Shenzhen (CN); Yang Pan, Shenzhen (CN); Jie Li, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 100 days.

(21) Appl. No.: 13/410,090

(22) Filed: Mar. 1, 2012

(65) Prior Publication Data

US 2012/0155721 A1 Jun. 21, 2012

Related U.S. Application Data

(63) Continuation of application No. PCT/CN2010/079158, filed on Nov. 26, 2010.

(30) Foreign Application Priority Data

Dec. 3, 2009 (CN) .......................... 2009 2 0261167

(51) Int. Cl.
*G06K 9/00* (2006.01)
*G06K 19/07* (2006.01)
*G06K 19/077* (2006.01)

(52) U.S. Cl.
CPC ............ *G06K 19/07* (2013.01); *G06K 19/0718* (2013.01); *G06K 19/07732* (2013.01)

(58) Field of Classification Search
None
See application file for complete search history.

(56) References Cited

U.S. PATENT DOCUMENTS

| 7,524,198 | B2 * | 4/2009 | Nguyen et al. ................. 439/131 |
| 7,869,219 | B2 * | 1/2011 | Ma et al. ........................ 361/737 |
| 2004/0123113 | A1 * | 6/2004 | Mathiassen et al. .......... 713/185 |
| 2005/0210270 | A1 * | 9/2005 | Rohatgi et al. ................ 713/186 |
| 2005/0257071 | A1 * | 11/2005 | Sugawara et al. ............. 713/193 |
| 2011/0107416 | A1 | 5/2011 | Poo et al. |

FOREIGN PATENT DOCUMENTS

| EP | 1 538 553 A1 | 6/2005 |
| JP | 2002-183704 A | 6/2002 |
| JP | 2003-067709 A | 3/2003 |
| JP | 2004-264915 A | 9/2004 |
| JP | 2005-025384 A | 1/2005 |
| JP | 2005-505026 A | 2/2005 |
| JP | 2005-196247 A | 7/2005 |

(Continued)

OTHER PUBLICATIONS

Australian Office Action received in Australian Patent Application No. 2010249184, mailed Apr. 13, 2012, 4 pages.
Notice of Reasons for Rejection received in Application No. 2012-528222, mailed Jun. 18, 2013, 11 pages.

(Continued)

*Primary Examiner* — Thomas Conway
(74) *Attorney, Agent, or Firm* — Slater & Matsil, L.L.P.

(57) ABSTRACT

A fingerprint identification data card and an electronic device are provided. The data card includes a case, a circuit board located in the case, an interface, and a fingerprint identifier. The case has a hole, the interface passes through the hole and the interface is connected with the circuit board, and the fingerprint identifier is disposed in the case and is connected with a processor on the circuit board in the case. It can be seen that, before using the data card, a user is required to input a fingerprint through the fingerprint identifier, and the user can use the data card only after passing authentication.

15 Claims, 7 Drawing Sheets

(56) References Cited

FOREIGN PATENT DOCUMENTS

| JP | 2007-066289 A | 3/2007 |
| WO | WO 03/003283 A1 | 1/2003 |

OTHER PUBLICATIONS

Written Opinion of the International Searching Authority received in Application No. PCT/CN2010/079158, mailed Mar. 10, 2011, 4 pages.

* cited by examiner

FINGERPRINT IDENTIFICATION DATA CARD AND ELECTRONIC DEVICE

CROSS-REFERENCE TO RELATED APPLICATIONS

This application is a continuation of International Application No. PCT/CN2010/079158, filed on Nov. 26, 2010, which claims priority to Chinese Patent Application No. 200920261167.8, filed on Dec. 3, 2009, both of which are hereby incorporated by reference in their entireties.

FIELD OF THE TECHNOLOGY

The present invention relates to the field of communication technologies, and more particularly to a fingerprint identification data card and an electronic device.

BACKGROUND OF THE INVENTION

With rapid development of mobile communication technologies, data services such as wireless network access get mature, and portable and small terminal equipments for wireless network access, such as, wireless data cards, attract more and more attention and get more and more popular. Wireless data cards do not need to be charged by a power supply, and can be directly inserted onto a universal serial bus (USB) port on a notebook computer or a desktop computer for being powered. The user only needs a subscriber identity module (SIM) card for data services through wireless internet access without the need of a network cable, and can enjoy the fun of Internet surfing anytime and anywhere.

The currently used data card requires the user to input a password, and after passing through authentication, the data card can be used.

However, the current data cards has disadvantages in terms of security, because the password input by the user is generally numerals, which can be easily cracked and has low security.

SUMMARY OF THE INVENTION

Accordingly, embodiments of the present invention are directed to a fingerprint identification data card capable of accessing a network securely.

In an embodiment, the present invention provides a fingerprint identification data card. The data card includes a case, a circuit board located in the case, an interface, and a fingerprint identifier. The case has a hole and the interface passes through the hole and is connected with the circuit board, and the fingerprint identifier is disposed in the case and is connected with a processor on the circuit board in the case.

In an embodiment, the present invention further provides an electronic device. The electronic device includes a data card, and the data card includes a case, a circuit board located in the case, an interface, and a fingerprint identifier. The case has a hole, the interface passes through the hole and the interface is connected with the circuit board, the fingerprint identifier is disposed in the case and is connected with a processor on the circuit board in the case, and the data card is connected with the electronic device through the interface.

It can be seen from the above that, before using the data card, a user is required to input a fingerprint through the fingerprint identifier, and the user can use the data card only after passing authentication. As the security of fingerprint authentication is much higher than that of password authentication, the security of use of the data card is further improved.

BRIEF DESCRIPTION OF THE DRAWINGS

To illustrate the technical solutions according to the embodiments of the present invention, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
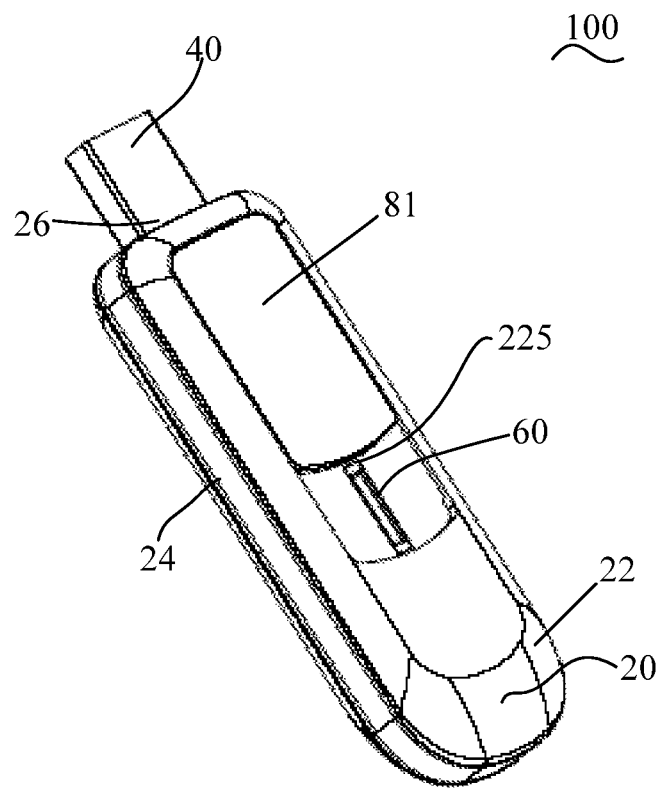
FIG. 1 is a schematic three-dimensional structural view of a fingerprint identification data card according to an embodiment of the present invention.

The technical solution under the present invention is elaborated below with reference to accompanying drawings. Evidently, the embodiments described below are for the exemplary purpose only, without covering all embodiments of the present invention. Those skilled in the art can derive other embodiments from the embodiments given herein without making any creative effort, and all such embodiments are covered in the protection scope of the present invention.

FIGS. 1, 3, 4, and 9 are schematic three-dimensional structural views of a fingerprint identification data card according to an embodiment of the invention. Referring to FIGS. 1, 3, 4, and 9, a data card 100 includes a case 20, a circuit board 21 located in the case 20, an interface 40, and a fingerprint identifier 60. The case 20 has a hole 26, the interface 40 passes through the hole 26 and the interface 40 is connected with the circuit board 21, and the fingerprint identifier 60 is disposed in the case 20 and is connected with a processor 90 on the circuit board in the case 20.

It can be seen from the above that, before using the data card, a user is required to input a fingerprint through the fingerprint identifier, and the user can use the data card only after passing authentication. As the security of fingerprint authentication is much higher than that of password authentication, the security of use of the data card is further improved.

It should be noted that, circuit board is mentioned in the description, that is, the circuit board 21 connected with the interface 40 and the circuit board having the processor, the two circuit boards may be a whole, that is, the circuit board connected with the interface 40 and the circuit board having the processor are the same circuit board. Definitely, the circuit board 21 connected with the interface 40 and the circuit board having the processor may be two circuit boards, and the two circuit boards are connected through a flexible circuit board, which is not limited in the present invention.

Furthermore, referring to FIG. 1 again, the data card 100 further includes a slide cover 81, and the slide cover 81 is disposed on the case 20. Referring to FIG. 2, the fingerprint identifier 60 is hidden under the slide cover 81. After the slide cover 81 slides with respect to the case 20, the fingerprint identifier 60 is exposed in the air, as shown in FIG. 1.

It can be seen that, through disposing the slide cover 81 on the case 20, when the data card is not used, the slide cover 81 shields the fingerprint identifier 60, and when a user is required to input a fingerprint, the slide cover 81 is slid, such that the fingerprint identifier 60 is exposed in the air, and the user can input the fingerprint. Accordingly, when the user does not use the data card, the fingerprint identifier 60 is hidden under the slide cover 81, thus preventing dust from entering the fingerprint identifier 60.

Figure 2:
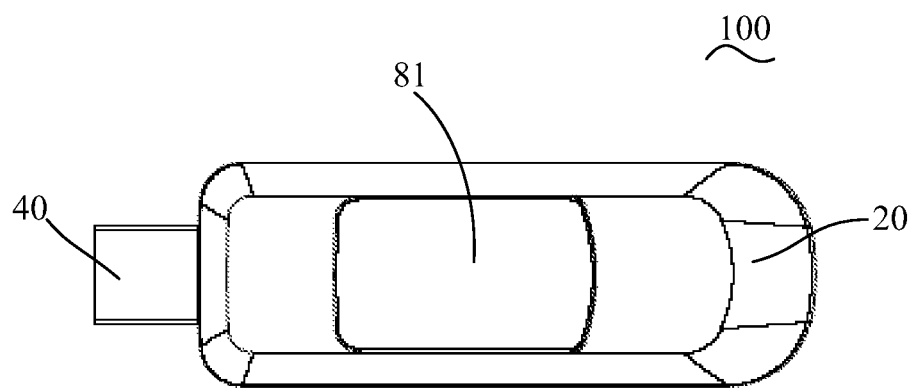
FIG. 2 is a schematic view of a fingerprint identification data card with a fingerprint identifier hidden under a slide cover according to an embodiment of the present invention.
Figure 3:
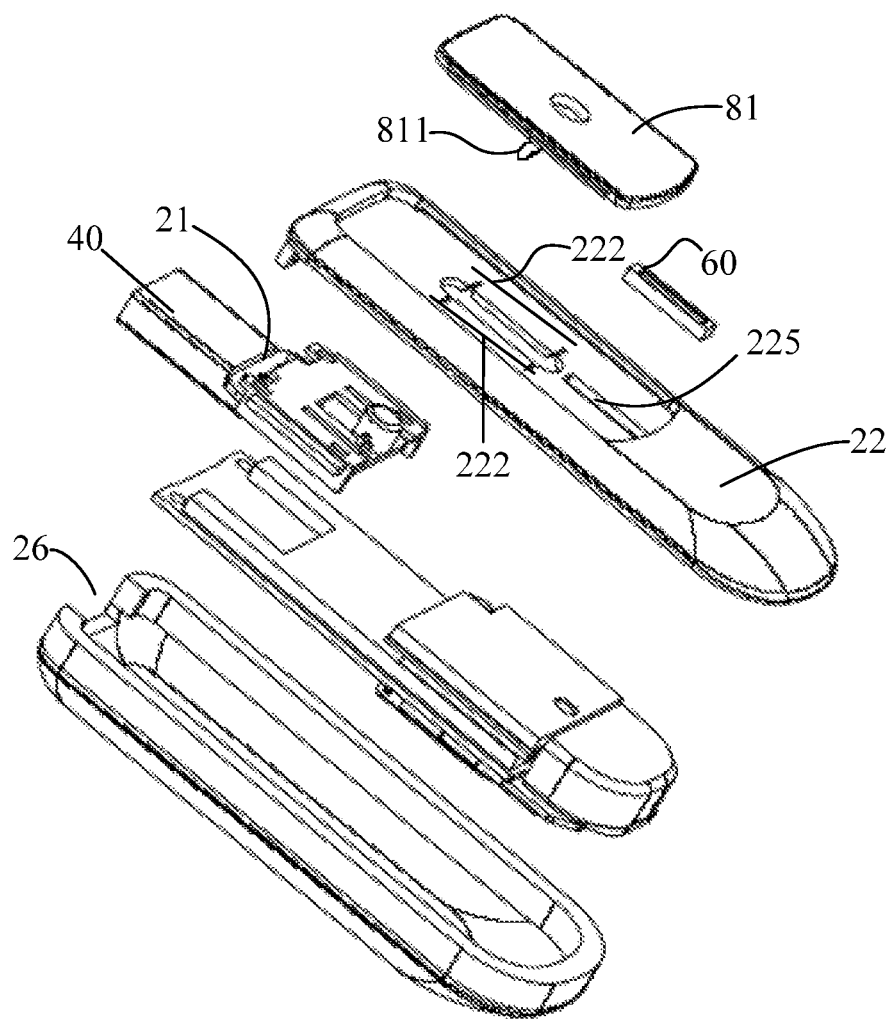
FIG. 3 is a schematic view of a first implementation mode of a fingerprint identification data card according to an embodiment of the present invention.
Figure 4:
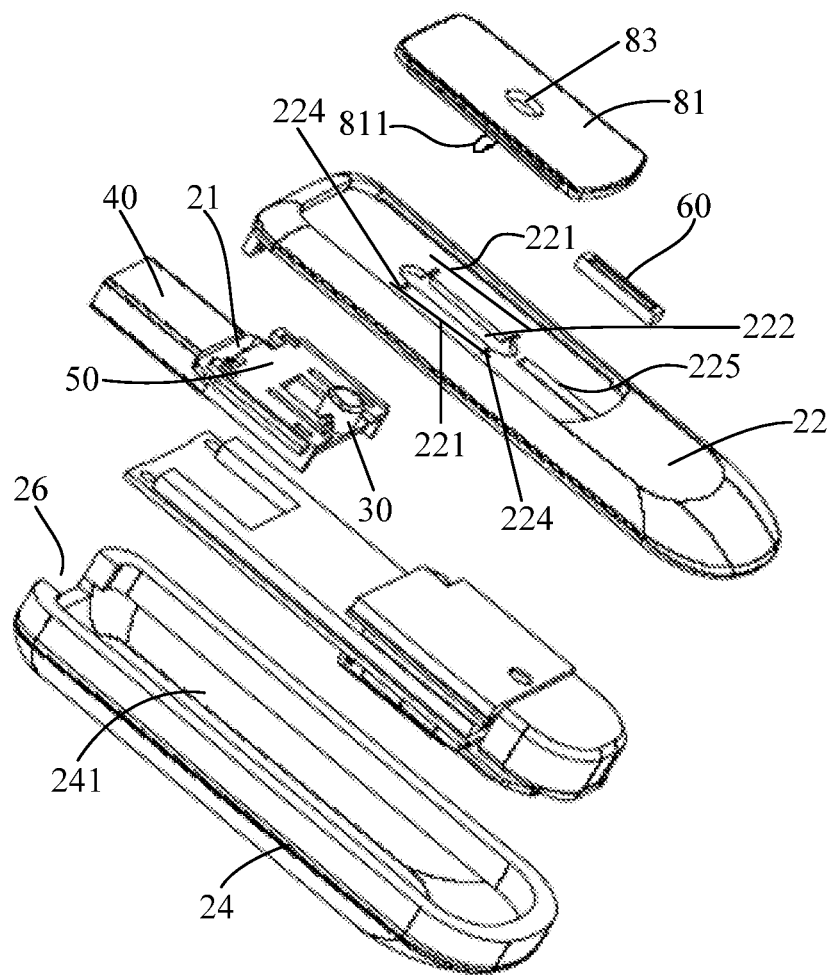
FIG. 4 is a schematic view of a second implementation mode of a fingerprint identification data card according to an embodiment of the present invention.

Referring to FIG. 1, 3, or 4, the case 20 includes an upper case 22 and a lower case 24. The upper case 22 has a cavity 225 opened thereon, the fingerprint identifier 60 is disposed in the cavity 225 and is connected with the processor on the circuit board in the case 20.

The slide cover 81 is disposed on the case 20, the fingerprint identifier 60 is hidden under the slide cover 81, and after the slide cover 81 slides with respect to the case 20, the fingerprint identifier 60 is exposed in the air. Specifically, the implementation methods are as follows.

A first implementation method will be described now. Referring to FIG. 3 again, the upper case 22 has slide slots 222 disposed thereon, the slide cover 81 has a slide block 811 protruding on a surface thereof, the slide block 811 is located in the slide slot 222, and the slide block 811 is capable of sliding along the slide slot 222.

The slide slot 222 may be opened obliquely downwards, such that the slide block 811 is prevented from sliding out of the slide slot 222. It should be noted that, the slide slot 222 may be a slide slot opened obliquely downwards, or a slide slot opened straightly downwards, and the invention is not limited thereto.

Figure 5:
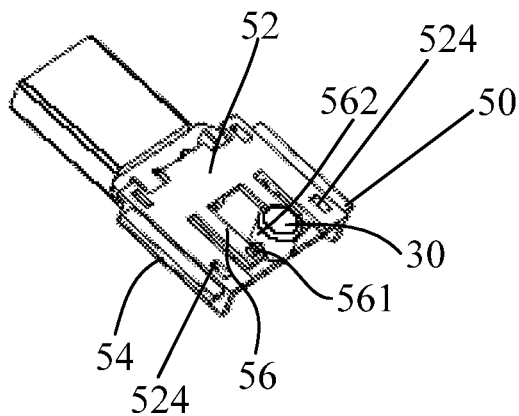
FIG. 5 is schematic three-dimensional structural view of a connection base in the second implementation mode of a fingerprint identification data card according to an embodiment of the present invention.

A second implementation method will be described now. Referring to FIG. 4 again, the data card 100 further includes a button 30 and a connection base 50, and the lower case 24 has first slide tracks 241 opened at inner sides respectively. FIG. 5 is a schematic three-dimensional structural view of the connection base. Referring to FIG. 5, the connection base 50 includes a base 52 and slide rails 54 protruding downwards along two sides of the base 52, and the slide rails 54 slide in the first slide track 241. The base 52 has a resilient rib 56 opened thereon, and the resilient rib 56 has a bump 561 protruding thereon, the button 30 is disposed on the bump 561 (specifically, a protruding point 562 is disposed on the bump 561, and the button 30 is disposed at the protruding point 562). At two sides of the resilient rib 56, small holes 524 are opened on the base 52.

Referring to FIG. 4, the upper case 22 has two second slide tracks 221 opened thereon, the slide cover 81 has two slide blocks 811 at two ends on a surface thereof, and the slide blocks 811 are capable of sliding in the second slide tracks 221.

A slide slot 222 is opened between the two second slide tracks 221, accommodation slots 224 for accommodating a bump 561 protruding on the resilient rib 56 are opened on the upper case 22, the accommodation slots 224 are located at two ends of the slide slot 222, and the accommodation slots 224 may be perpendicular to the slide slot 222.

A circuit board 21 connected with the interface 40 may be fixedly disposed on the connection base 50. The slide cover 81 has a hole 83 opened thereon.

When assembling the data card 100, the interface 40 first passes through the hole 26 and is connected with the circuit board 21, so as to fix the circuit board 21 on the connection base 50. The connection base 50 is slidably disposed in the first slide tracks 241 at inner sides of the lower case 24 through the slide rail 54. Thus, as the circuit board 21 is fixed on the connection base 50, during the process that the connection base 50 slides along the slide rail 54, the interface 40 connected with the circuit board 21 also moves, thus the interface 40 extends out of the hole 26, or is drawn back in the case 20. Next, the button 30 is disposed on the protruding point 562 of the resilient rib 56, and the upper case 22 is fastened with the lower case 24 through a fastening structure, moreover, the button 30 penetrates through the slide slot 222. Finally, the slide blocks 811 of the slide cover 81 penetrate through the second slide tracks 221, and the slide blocks 811 are fastened in the small holes 524, and the button 30 is located in the hole 83 of the slide cover 81.

The bump 561 protruding on the resilient rib 56 is accommodated in the accommodation slot 224 at an end of the slide slot 222.

It should be noted that, the above is one embodiment of assembling of the data card 100, other assembling methods are also available, and the present invention is not limited thereto.

Figure 6:
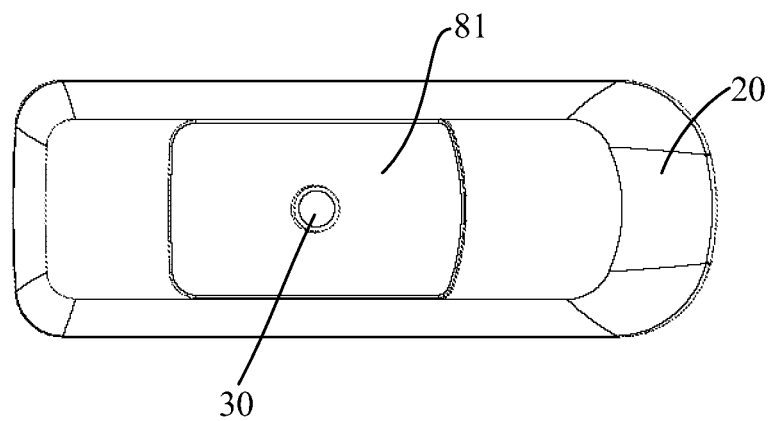
FIG. 6 is a schematic view of the second implementation mode of a fingerprint identification data card with an interface drawn back in a case according to an embodiment of the present invention.
Figure 7:
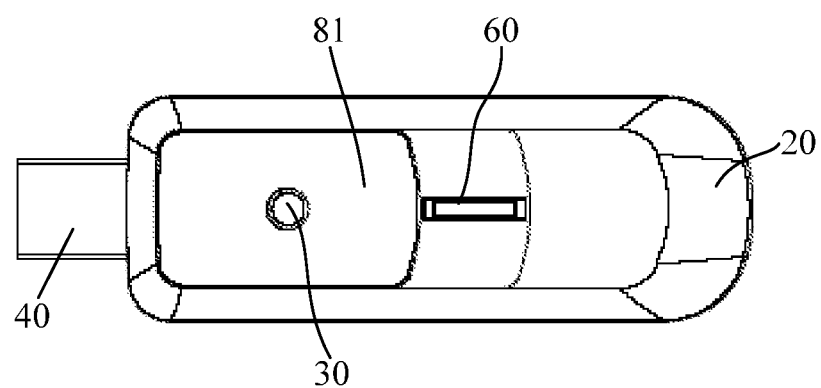
FIG. 7 is a schematic view of the fingerprint identification data card in FIG. 6 with the interface extending out of a hole.

Hereinafter, referring to FIG. 6, the movement of the fingerprint identification data card is described. The interface 40 is assumed to be drawn back in the case 20, and the fingerprint identifier 60 is hidden under the slide cover 81; that is to say, the data card 100 is in a state of not being used. When the data card 100 is used by a user, that is, the data card 100 is inserted into the electronic device (for example, a notebook or a netbook), an external force is applied to press the button 30, and the slide cover 81 is slid, thus the bump 561 accommodated in the accommodation slot 224 is departed from the accommodation slot 224, and when the slide cover 81 moves, the connection base 50 is driven to slide, such that the interface 40 moves outwards from the hole 26, and when the bump 561 protruding on the resilient rib 56 is accommodated in the accommodation slots 224 at the other end of the slide slot 222, the bump 561 is fastened in the accommodation slot 224, and meanwhile, the interface 40 extends out of the hole 26. Referring to FIG. 7, thus, the user can insert the interface 40 into a corresponding interface of the electronic device.

As for the second implementation method, it can be seen that, the fingerprint identifier 60 may be hidden under the slide cover 81, and meanwhile, the interface 40 is located in the case 20. When the button 30 is pressed and the slide cover 81 slides, the fingerprint identifier 60 is exposed in the air, and the interface 40 extends out of the hole 26. Thus, the slide cover 81 shields the fingerprint identifier 60 and prevents dust from entering. Moreover, through the connection base 50, the circuit board 21 fixedly disposed in the connection base 50, and the interface 40 connected with the circuit board 21, when the slide cover 81 slides, the interface 40 is driven to extend out of the hole 26 or be drawn back into the case 20, thus preventing dust from entering the interface 40, so as to provide better prevention for the interface 40.

Figure 8:
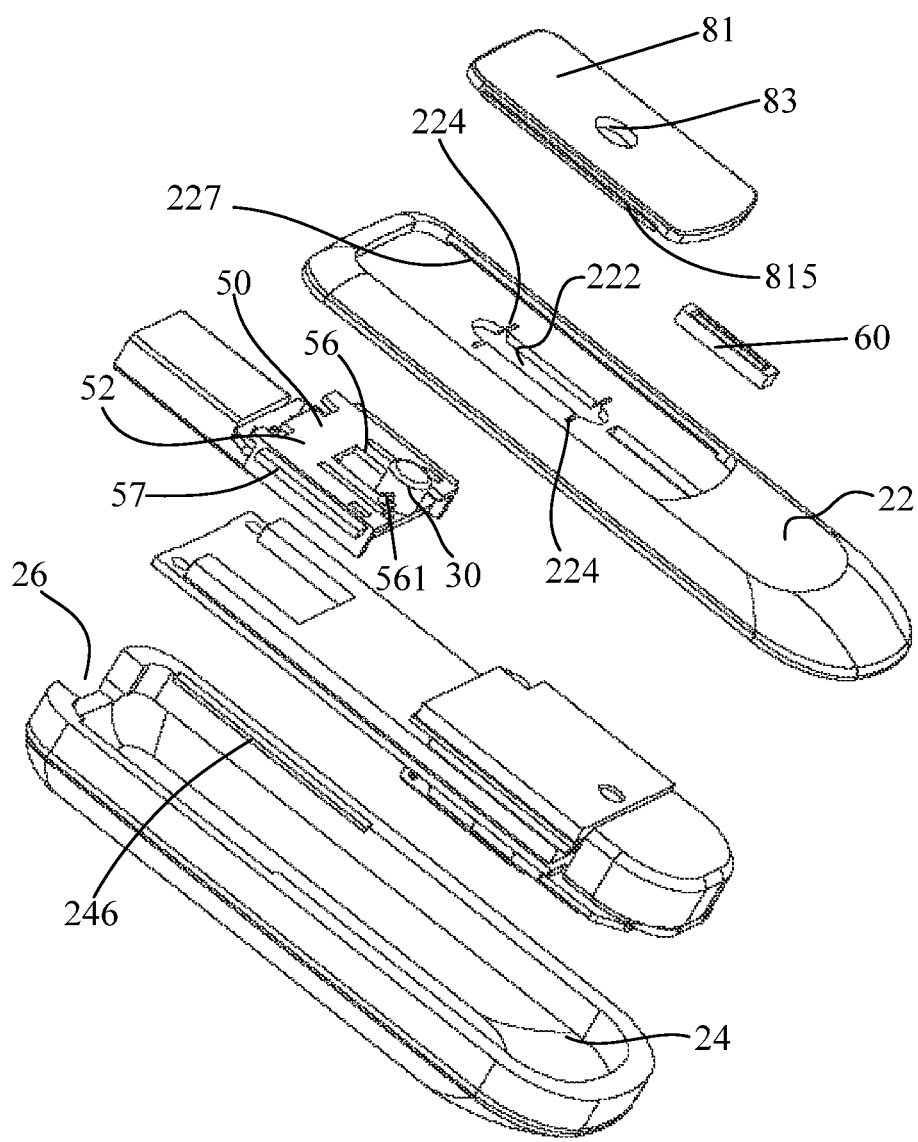
FIG. 8 is a schematic view of a third implementation mode of a fingerprint identification data card according to an embodiment of the present invention.

A third implementation method will be described now. Referring to FIG. 8, the upper case 22 has slide track slots 227 opened thereon, the slide cover 81 has slide bars 815 protruding at two sides thereof, the slide bars 815 are embedded in the slide track slots 227, and when the slide cover 81 slides with respect to the upper case 22, the slide bars 815 slide with respect to the slide track slots 227.

Referring to FIG. 8 again, furthermore, the data card further includes a button 30 and a connection base 50. The lower case 24 has first slide slots 246 opened at inner sides thereof respectively, the upper case 22 has a slide slot 222 opened thereon, the upper case 22 has accommodation slots 224 opened thereon, and the accommodation slots 224 are located at two ends of the slide slot 222. The connection base 50 includes a base 52 and slide rails 57 protruding outwards along two sides of the base 52. The base 52 has a resilient rib 56 opened thereon, and the resilient rib 56 has a bump 561 protruding thereon, the button 30 is disposed on the bump 561, the slide cover 81 has a hole 83 opened thereon, and the button 30 penetrates through the slide slot 222 and is located in the hole 83 of the slide cover 81. The bump 561 is accommodated in the accommodation slot 224 at one end of the slide slot 222, and the slide rails 57 are slidably disposed in the first slide slots 246.

For the assembly and movement of the data card in the third implementation method, reference is made to the second implementation method, which will not be repeated herein.

It should be understood that, as mentioned in the third implementation method, the lower case 24 has first slide slots 246 opened at inner sides thereof respectively, the connection base 50 includes a base 52 and slide rails 57 protruding outwards along two sides of the base 52, and the slide rail 57 is slidably disposed in the first slide slots 246, which can also be implemented by adopting the following method.

The lower case has first protruding bars disposed at inner sides thereof respectively, the connection base includes a base and first slide tracks recessed inwards along two sides of the base, and the first protruding bars are slidably disposed in the first slide tracks. In this manner, the connection base can also slide with respect to the lower case.

It should be understood that, in the embodiments, the upper case 22 may also be fastened with the lower case 24 through the following method. A protruding point is disposed at inner sides of the lower case 24, and a clamp piece having a hole extends out of the upper case 22. When the upper case 22 is fastened with the lower case 24, the clamp piece having the hole is fastened at the protruding point, such that the upper case 22 is fastened with the lower case 24. Definitely, the present invention does not limit the method of fastening the upper case 22 and the lower case 24 together.

In an embodiment, the present invention further provides an electronic device. The electronic device includes a data card 100, and the data card 100 includes a case 20, a circuit board 21 located in the case, an interface 40, and a fingerprint identifier 60. The case 20 has a hole 26, the interface 40 passes through the hole 26 and the interface 40 is connected with the circuit board 21, the fingerprint identifier 60 is disposed in the case 20 and is connected with a processor on the circuit board in the case 20, and the data card 100 is connected with the electronic device through the interface 40.

It can be seen from the above that, before using the data card, a user is required to input a fingerprint through the fingerprint identifier, and the user can use the data card only after passing authentication. As the security of fingerprint authentication is much higher than that of password authentication, the security of use of the data card is further improved.

The electronic device is a computer, a notebook, or netbook, or other wireless terminals where the data card can be inserted, which is not limited in the present invention.

It should be understood that, the data card 100 in the electronic device may be the data cards shown in FIGS. 1 to 8, reference is made to the description of FIGS. 1 to 8, and the electronic device of the present invention will not be repeated herein.

As for all the embodiments above, the interface 40 includes, but not limited to, a PCMCIA interface, a USB interface, an EXPRESS34 interface, and a CF interface.

Figure 9:
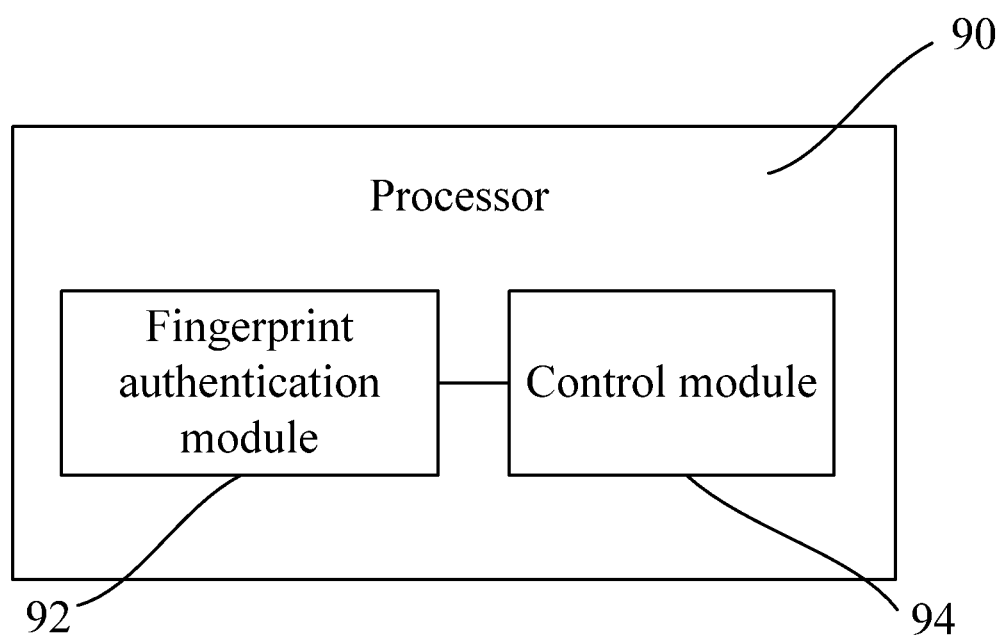
FIG. 9 is a schematic view of a processor of a circuit board of a fingerprint identification data card according to an embodiment of the present invention.

As for all the embodiments above, referring to FIG. 9, the processor 90 includes a fingerprint authentication module 92 and a control module 94.

The fingerprint authentication module 92 is configured to compare collected fingerprint information with a stored fingerprint template, and output a comparison result.

The control module 94 is configured to permit to use the data card to access a network, when the collected fingerprint information is matched with a fingerprint template.

The fingerprint information may be collected by the fingerprint identifier 60.

It should be noted that, "the first", "the second", and so on in the embodiments are named to distinguish elements in the drawings, but not used to limit the present invention.

Furthermore, the slide cover 81 in the first implementation method and the second implementation method adopts the same reference numerals for convenience of illustration, and definitely, slide covers with different structures may be used, which is not limited in the present invention.

The above descriptions are merely several embodiments of the present invention, persons of ordinary skill in the art can make various modifications or variations according to the specification of the application file without departing from the principle of the present invention.

What is claimed is:

1. A fingerprint identification device, comprising:
   a case having a hole and accommodation slots;
   a movable slide cover disposed on the case and having a hole opened thereon;
   a first circuit board;
   an interface, wherein the interface is capable of passing through the hole formed in the case and the interface is connected with the first circuit board;
   a second circuit board, wherein the second circuit board is connected with the first circuit board through a flexible printed circuit;
   a processor attached to the second circuit board;
   a fingerprint identifier embedded in the case and electronically connected with the processor on the second circuit board in the case;
   a connection base, wherein the first circuit board is fixedly connected with the connection base and the connection base is fixedly connected with the slide cover, the connection base comprising a base that has a resilient rib with a bump protruding thereon; and
   a button fixed on the bump and located in the hole of the slide cover;
   wherein the slide cover is movable between a first position and a second position, the fingerprint identifier being hidden under the slide cover and the interface being retracted when the slide cover is in the first position, and the fingerprint identifier being exposed and the interface being extended through the hole when the slide cover is in the second position;

wherein two ends of the bump are adapted to be accommodated in the accommodation slots for securing the slide cover in the first or in the second position; and wherein, when a pressing pressure is applied down into the button located in the hole of the slide cover, the two ends of the bump are removed out of the accommodation slots, such that the slide cover is movable between the first position and the second position under a pushing pressure applied on the slide cover.

2. The device according to claim 1, wherein the processor comprises:

a fingerprint authentication module, configured to compare collected fingerprint information with a stored fingerprint template and to output a comparison result; and a control module, configured to permit the device to be used to access a network when the collected fingerprint information is matched with a fingerprint template.

3. The device according to claim 1, wherein the processor is programmed to compare collected fingerprint information with a stored fingerprint template.

4. The device according to claim 1, wherein the processor is programmed to permit the device to be used to access a network when collected fingerprint information matches a fingerprint template.

5. The device according to claim 1, wherein the first circuit board is capable of sliding relative to the second circuit board such that the interface is extended out of the hole or is drawn back in the case.

6. The device according to claim 1, wherein the second circuit board is fixed in the case.

7. The device according to claim 1, wherein the first circuit board connected with the interface is fixedly disposed at the connection base.

8. The device according to claim 1, wherein the interface is a PCMCIA interface, a USB interface, an EXPRESS 34 interface, or a CF interface.

9. The device according to claim 1, wherein the case comprises an upper case and a lower case, wherein the upper case has a cavity opened thereon, wherein the fingerprint identifier is disposed in the cavity, and wherein the fingerprint identifier is connected with the processor on the second circuit board in the case.

10. The device according to claim 9, wherein the upper case has slide track slots opened thereon, wherein the slide cover has slide bars protruding at two sides thereof, wherein the slide bars are embedded in the slide track slots, and wherein the slide bars slide with respect to the slide track slots when the slide cover slides with respect to the upper case.

11. The device according to claim 10, wherein the lower case has first slide slots opened at inner sides thereof respectively, wherein the upper case has a slide slot opened thereon, wherein the upper case has the accommodation slots opened thereon, wherein the accommodation slots are located at two ends of the slide slot, wherein the button penetrates through the slide slot and is located in the hole of the slide cover, wherein the two ends of the bump are adapted to be accommodated in any one of the accommodation slot at an end of the slide slot, and wherein slide rails protruding downwards along two sides of the base are slidably disposed in the first slide slots.

12. The device according to claim 10, wherein the lower case has first protruding bars disposed at inner sides thereof respectively, wherein the upper case has a slide slot opened thereon, wherein the upper case has the accommodation slots opened thereon, wherein the accommodation slots are located at two ends of the slide slot, wherein the button penetrates through the slide slot and is located in the hole of the slide cover, wherein the two ends of the bump are adapted to be accommodated in any one of the accommodation slots at an end of the slide slot, and wherein the first protruding bars are slidably disposed in first slide tracks disposed along two sides of the base.

13. The device according to claim 9, wherein the upper case has a slide slot opened thereon, wherein the slide cover has a slide block protruding on a surface thereof, wherein the slide block is located in the slide slot, and wherein the slide block slides with respect to the slide slot when the slide cover slides with respect to the upper case.

14. The device according to claim 13, wherein the lower case has first slide tracks opened at inner edges thereof, wherein the upper case has two second slide tracks opened thereon, and wherein the slide slot is opened between the two second slide tracks.

15. The device according to claim 14, wherein the upper case has the accommodation slots opened thereon, wherein the accommodation slots are located at two ends of the slide slot, the base has small holes opened thereon at two ends of the resilient rib, wherein the button penetrates the slide slot and is located in the hole of the slide cover, wherein the two ends of the bump are adapted to be accommodated in any one of the accommodation slot at an end of the slide slot, wherein slide rails protruding downwards along two sides of the base are slidably disposed in the first slide tracks, and wherein the slide blocks at two ends of a surface of the slide cover pass through the second slide tracks, and is fastened in the small holes at two sides of the resilient rib.

* * * * *